US011522754B2

(12) United States Patent
Narayanan et al.

(10) Patent No.: US 11,522,754 B2
(45) Date of Patent: Dec. 6, 2022

(54) SYSTEMS AND METHODS FOR ZERO-TOUCH PROVISIONING OF A SWITCH IN INTERMEDIATE DISTRIBUTION FRAMES AND MAIN DISTRIBUTION FRAMES

(71) Applicant: Arista Networks, Inc., Santa Clara, CA (US)

(72) Inventors: Kumar Narayanan, Saratoga, CA (US); John French, Pacifica, CA (US)

(73) Assignee: ARISTA NETWORKS, INC., Santa Clara, CA (US)

(\*) Notice: Subject to any disclaimer, the term of this patent is extended or adjusted under 35 U.S.C. 154(b) by 0 days.

(21) Appl. No.: 17/021,249

(22) Filed: Sep. 15, 2020

(65) Prior Publication Data

US 2022/0086040 A1 Mar. 17, 2022

(51) Int. Cl.
*H04L 12/24* (2006.01)
*H04L 41/0806* (2022.01)
*H04L 41/08* (2022.01)
*H04L 12/46* (2006.01)

(52) U.S. Cl.
CPC ...... *H04L 41/0806* (2013.01); *H04L 12/4641* (2013.01); *H04L 41/0886* (2013.01)

(58) Field of Classification Search
CPC ............. H04L 41/0806; H04L 12/4641; H04L 41/0886; H04L 12/4645
See application file for complete search history.

(56) References Cited

U.S. PATENT DOCUMENTS

| 10,785,094 B1* | 9/2020 | Thubert ................ H04L 49/253 |
| 10,797,968 B2* | 10/2020 | Suthar ................ H04L 41/0806 |
| 10,938,855 B1* | 3/2021 | Waldie ................ G06F 21/575 |
| 11,277,283 B2* | 3/2022 | Hegde ................ H04L 12/2859 |
| 2007/0211730 A1* | 9/2007 | Cuthbert ............ H04L 12/4641 370/395.53 |
| 2007/0297396 A1* | 12/2007 | Eldar ...................... H04L 63/08 370/356 |
| 2009/0165099 A1* | 6/2009 | Eldar .................. H04L 41/0869 726/5 |
| 2010/0287266 A1* | 11/2010 | Asati ................... H04L 12/4641 709/222 |
| 2014/0013324 A1* | 1/2014 | Zhang ..................... H04L 49/70 718/1 |

(Continued)

OTHER PUBLICATIONS

International Search Report in International Patent Application No. PCT/US2021/050561 dated Oct. 14, 2021; 6 pages.

*Primary Examiner* — Michael Won
(74) *Attorney, Agent, or Firm* — Fountainhead Law Group P.C.

(57) ABSTRACT

Systems and methods are provided herein for an improved method of Zero-Touch Provisioning (ZTP) where a first switch receives a virtual local area network (VLAN) identifier from a second switch, allowing the first switch to reach a dynamic host configuration protocol (DHCP) server. This may be accomplished by a first switch receiving a VLAN identifier from a second switch. The first switch then transmits a DHCP discover message using the VLAN identifier. The first switch then receives reachability information for a ZTP server from the DHCP server. The first switch uses the reachability information to establish a provisioning session between the first switch and the ZTP server.

20 Claims, 7 Drawing Sheets

(56) References Cited

U.S. PATENT DOCUMENTS

| | | | |
|---|---|---|---|
| 2015/0355934 A1* | 12/2015 | Yin | H04L 47/627 |
| | | | 718/1 |
| 2018/0034698 A1* | 2/2018 | Perez | H04L 41/0886 |
| 2019/0132322 A1* | 5/2019 | Song | H04L 63/0236 |
| 2019/0334865 A1* | 10/2019 | Nagarajan | H04L 12/4641 |
| 2020/0042365 A1* | 2/2020 | Tanna | G06F 9/465 |
| 2020/0162348 A1* | 5/2020 | Suthar | H04L 41/5048 |
| 2020/0169516 A1* | 5/2020 | Patel | H04L 45/44 |
| 2020/0322838 A1* | 10/2020 | Thubert | H04L 49/50 |
| 2021/0067380 A1* | 3/2021 | Hegde | H04L 41/0886 |
| 2021/0184930 A1* | 6/2021 | Mutnuru | H04L 45/64 |
| 2021/0184936 A1* | 6/2021 | Mutnuru | H04L 41/0893 |
| 2021/0255876 A1* | 8/2021 | Puhan | G06F 9/45558 |
| 2021/0297409 A1* | 9/2021 | Rahn | H04L 69/167 |
| 2021/0351948 A1* | 11/2021 | Lewis | H04L 41/12 |

* cited by examiner

SYSTEMS AND METHODS FOR ZERO-TOUCH PROVISIONING OF A SWITCH IN INTERMEDIATE DISTRIBUTION FRAMES AND MAIN DISTRIBUTION FRAMES

BACKGROUND

The present disclosure relates to the provisioning of networking devices, and in particular to systems and methods for Zero-Touch Provisioning (ZTP) of a switch.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Newly installed switches often require initial provisioning in order to be onboarded into a network environment. Traditionally, switches are provisioned by an on-site technician who installs the configurations and software of each device individually. For example, a switch, such as an access switch, is first taken to a wiring closet by an on-site technician. An access switch may be any switch that connects hosts to a network. The technician then powers up the access switch and, using a console cable and/or USB, configures the switch. The technician then checks to make sure the right image is loaded onto the switch. This process can be error prone and usually requires substantial amounts of time and money. The complicated process can be exacerbated when a network has a large number of switches that require provisioning. To help expedite this process, many networks utilize Zero-Touch Provisioning (ZTP). ZTP is a mechanism that allows network devices (switches, routers, etc.) to be provisioned and configured automatically, eliminating most of the manual labor involved when adding network devices to a network. In most cases, a device using ZTP needs to be able to reach a dynamic host configuration protocol (DHCP) server to both receive an IP address for itself and an IP address for the ZTP server. Once the device receives the IP address for the ZTP server and connects to the ZTP server, the ZTP server will be able to provision the connected device.

Data center environments rely on dedicated management networks to facilitate ZTP. A dedicated management network is separate from the production network and often uses an entirely separate infrastructure (switches, cabling, etc.) to network the management ports on the devices that are managed by the dedicated management network. A dedicated management network allows for operations, such as ZTP, to occur without depending on the normal production network. For example, a switch is able to easily access the correct DHCP server using the dedicated management network.

There are many deficiencies that exist in current ZTP implementations because many network types lack viable options for a switch to reach a DHCP server. For example, because many non-data centers lack a dedicated management network (due, in part, to the limited number of uplink fibers available in non-data centers), switches cannot easily access the DHCP server. If a switch cannot reach the DHCP server, then the switch will not be able to reach the correct ZTP server, making ZTP impossible. For example, main distribution frames (MDFs) and intermediate distribution frames (IDFs) lack dedicated management networks, making ZTP deployment particularly challenging.

Various systems and methods described herein address these problems by providing a method of ZTP where a first switch receives a VLAN identifier (VLAN ID) from a second switch, allowing the first switch to reach the DHCP server. The first and second switches may be access switches, aggregation switches, or any similar such switches and may be in any combination. An aggregation switch may be any switch that connects other switches (e.g., access switches) to a core switch, where the core switch facilitates communication to the DHCP server. In many embodiments of the systems and methods described herein the first switch is an access switch that receives a VLAN ID from an aggregation switch (the second device); however, any combination of switch types may be used. For example, an access switch may receive a VLAN ID from another access switch, and an aggregation switch may receive a VLAN ID from an access switch or another aggregation switch.

A first switch may receive a first message from a second switch. In some embodiments, the second switch is configured to advertise unsolicited messages to the network at regular time intervals and the first message is one of these messages. In some embodiments, the second switch may be responding to a request for bootup information received from the first switch. The first message received from the second switch may be any message type that is encapsulated in ethernet frames for the purpose of giving devices a means of announcing basic information to other devices on a LAN, with one example being a link layer discovery protocol (LLDP) message. The first message also includes a VLAN ID, which identifies the specific VLAN, allowing the first switch to reach the DHCP server by sending a DHCP request on said VLAN. In some embodiments, the first message also includes additional ZTP-related information. For example, the first message may contain multiple VLAN IDs (where multiple VLAN headers are required), authentication information, and similar such ZTP-related information. The first switch sends out a DHCP discover message where the discover message is tagged with the VLAN ID. The discover message is able to reach the DHCP server because the discover message is tagged with the VLAN ID. The VLAN ID tag ensures that the discover message is routed onto a VLAN corresponding to the VLAN ID. For example, a network device that receives traffic tagged with a VLAN ID will forward the traffic using the VLAN that has that identifier corresponding to the VLAN ID or route the traffic to another VLAN that has reachability to the DHCP server. In some embodiments, the VLAN corresponding to the VLAN ID will have reachability to the DHCP server because the VLAN is the VLAN where the DHCP server resides. In some embodiments, the VLAN corresponding to the VLAN ID will have reachability to the DHCP server because the VLAN will route the DHCP discover message to the DHCP server. The DHCP server is reachable through the VLAN that has the identifier corresponding to the VLAN ID received from the second switch. After the first switch contacts the DHCP server, the DHCP server will assign the first switch an IP address. The DHCP server will also send reachability information (e.g., IP address and/or the uniform resource locator (URL)) corresponding to the ZTP server to the first switch. In an embodiment, the correct ZTP server may be managed by workload orchestration software. In an embodiment, the workload orchestration software may be CloudVision® Portal (CVP), which is offered by Arista Networks™. The first switch uses the reachability information to connect to the correct ZTP server. After the first switch connects to the ZTP server, the ZTP server provisions the first switch. This approach allows for seamless introduction of a first switch into a network and allows for more centralized control of switches in the network.

Figure 1A:
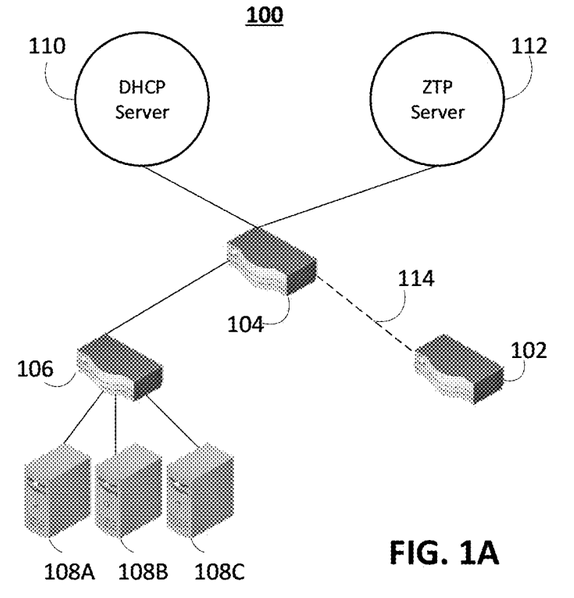
FIG. 1A shows an illustrative network topology of a system where a switch is provisioned using the improved ZTP process, in accordance with some embodiments of the disclosure.

FIG. 1A shows an illustrative network topology of a system 100 where a switch 102 is provisioned using the improved ZTP process. The system 100 includes switches 102, 104, and 106. Switch 106 is shown as an access switch servicing hosts 108A-C. Switch 104 is shown as an aggregation switch that connects access switch 106 and switch 102 to servers 110 and 112. System 100 is shown as having a DHCP server 110 and a ZTP server 112. In some embodiments, links between switches 102, 104, and 106 and servers 110 and 112 may be an overlay configured over an underlay of physical devices. One skilled in the art would understand that the same techniques described herein may be used by a system in similar network topologies containing any suitable number of devices.

In the shown embodiment, switch 102 is a newly installed switch that requires provisioning. In some embodiments, switch 102 may be an existing switch that requires updated provisioning. Switch 102 may be an access switch, aggregation switch, or any similar such switch. Switch 102 may receive an LLDP message from switch 104. In some embodiments, the message may be any message type that is encapsulated in ethernet frames for the purpose of giving devices a means of announcing basic information to other devices on a LAN. Switch 104 may send the LLDP message in response to a request for bootup information received from switch 102. For example, upon bootup, switch 102 may determine that switch 102 does not have a startup configuration file and requests bootup information from switch 104 using link 114. In some embodiments, bootup information can include start-up configuration files, boot records, a VLAN ID for a VLAN that can be used to reach a DHCP server and/or similar such information for configuring a switch. In some embodiments, switch 104 is configured to advertise unsolicited LLDP messages to the network at regular time intervals. The LLDP message may also include a VLAN ID that identifies the specific VLAN where a switch can reach the DHCP server 110. In some embodiments, the LLDP message also includes additional ZTP-related information (e.g., multiple VLAN IDs, authentication information, and/or similar such ZTP-related information).

After receiving the LLDP message, switch 102 may transmit a DHCP discover message along link 114, where the discover message is tagged with the VLAN ID provided by the LLDP message. The discover message reaches DHCP server 110 because the discover message is tagged with the VLAN ID provided by the LLDP message. The VLAN ID tag ensures that the discover message is routed onto a VLAN corresponding to the VLAN ID. For example, when switch 104 receives traffic tagged with a first VLAN ID, switch 104 will forward the traffic to the VLAN that has that corresponding identifier. In some embodiments, the DHCP discover message is forwarded to the DHCP server using the VLAN that has the identifier corresponding to the VLAN ID provided by the LLDP message. Although link 114 is shown as a single link connecting switch 102 to the network, switch 102 may have other links to other switches that are not shown to avoid overcomplicating the drawings. For example, switch 102 may be connected to any number of other switches (e.g., aggregate switches, access switches, etc.). In some embodiments, switch 102 may use links other than link 114 to reach both DHCP server 110 and ZTP server 112.

In some embodiments, in response to the DHCP discover message, DHCP server 110 assigns switch 102 an IP address. DHCP server 110 may also send reachability information (e.g., IP address and/or the uniform resource locator (URL)) corresponding to ZTP server 112 to switch 102. Switch 102 is configured to use the reachability information to connect to ZTP server 112. After switch 102 connects to ZTP server 112, ZTP server 112 provisions switch 102. In an embodiment, ZTP server 112 is managed by workload orchestration software (e.g., CVP).

Figure 1B:
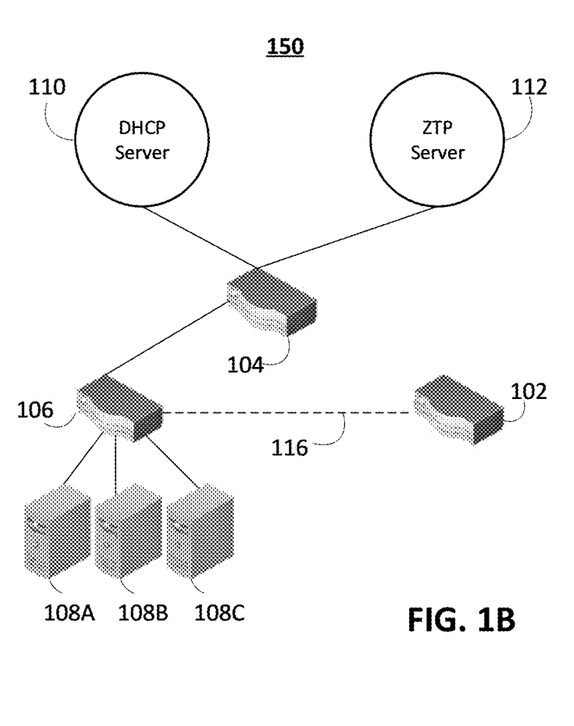
FIG. 1B shows another illustrative network topology of a system where a switch is provisioned using the improved ZTP process, in accordance with some embodiments of the disclosure.

FIG. 1B shows an illustrative network topology of a system 150 where a switch 102 is provisioned using the improved ZTP process. System 150 may have the same devices and links as shown in system 100 except switch 102 is connected to switch 106 using link 116. In some embodiments, switch 102 may have both link 114 and link 116.

In the shown embodiment, switch 102 is a newly installed switch that requires provisioning. In some embodiments, switch 102 may receive an LLDP message from switch 106. As mentioned above, the LLDP may be any message type that is encapsulated in ethernet frames for the purpose of giving devices a means of announcing basic information to other devices on a LAN. Switch 106 may send the LLDP message in response to a request for bootup information received from switch 102. For example, upon bootup, switch 102 may determine that switch 102 does not have a startup configuration file and requests bootup information from switch 106 using link 116. In some embodiments, switch 106 is configured to advertise unsolicited LLDP messages to the network at regular time intervals. The LLDP message may also include a VLAN ID that identifies a VLAN where a switch can reach the DHCP server 110.

After receiving the LLDP message, switch 102 sends out a DHCP discover message along link 116, where the discover message is tagged with the VLAN ID provided by the LLDP message. The discover message reaches DHCP server 110 because the discover message is routed onto a VLAN corresponding to the VLAN ID tag. The VLAN corresponding to the VLAN ID will have reachability to the DHCP server. For example, when switch 106 receives traffic tagged with a first VLAN ID, switch 106 will forward the traffic to the VLAN that has that corresponding identifier. In some embodiments, the VLAN corresponding to the VLAN ID will have reachability to the DHCP server because the VLAN is the VLAN where the DHCP server resides. In some embodiments, the VLAN corresponding to the VLAN ID will have reachability to the DHCP server because the VLAN will route the DHCP discover message to the DHCP server. As described above, link 116 is shown as a single link connecting switch 102 to the network, but switch 102 may have other links to other switches that are not shown to avoid overcomplicating the drawings. In some embodiments, switch 102 may use links other than link 116 to reach both DHCP server 110 and ZTP server 112.

In some embodiments, in response to the DHCP discover message, DHCP server 110 assigns switch 102 an IP address. DHCP server 110 may also send reachability information (e.g., IP address and/or the URL) corresponding to ZTP server 112 to switch 102. Switch 102 is configured to use the reachability information to connect to ZTP server 112. After switch 102 connects to ZTP server 112, ZTP server 112 provisions switch 102. In an embodiment, ZTP server 112 is managed by workload orchestration software (e.g., CVP).

Figure 2:
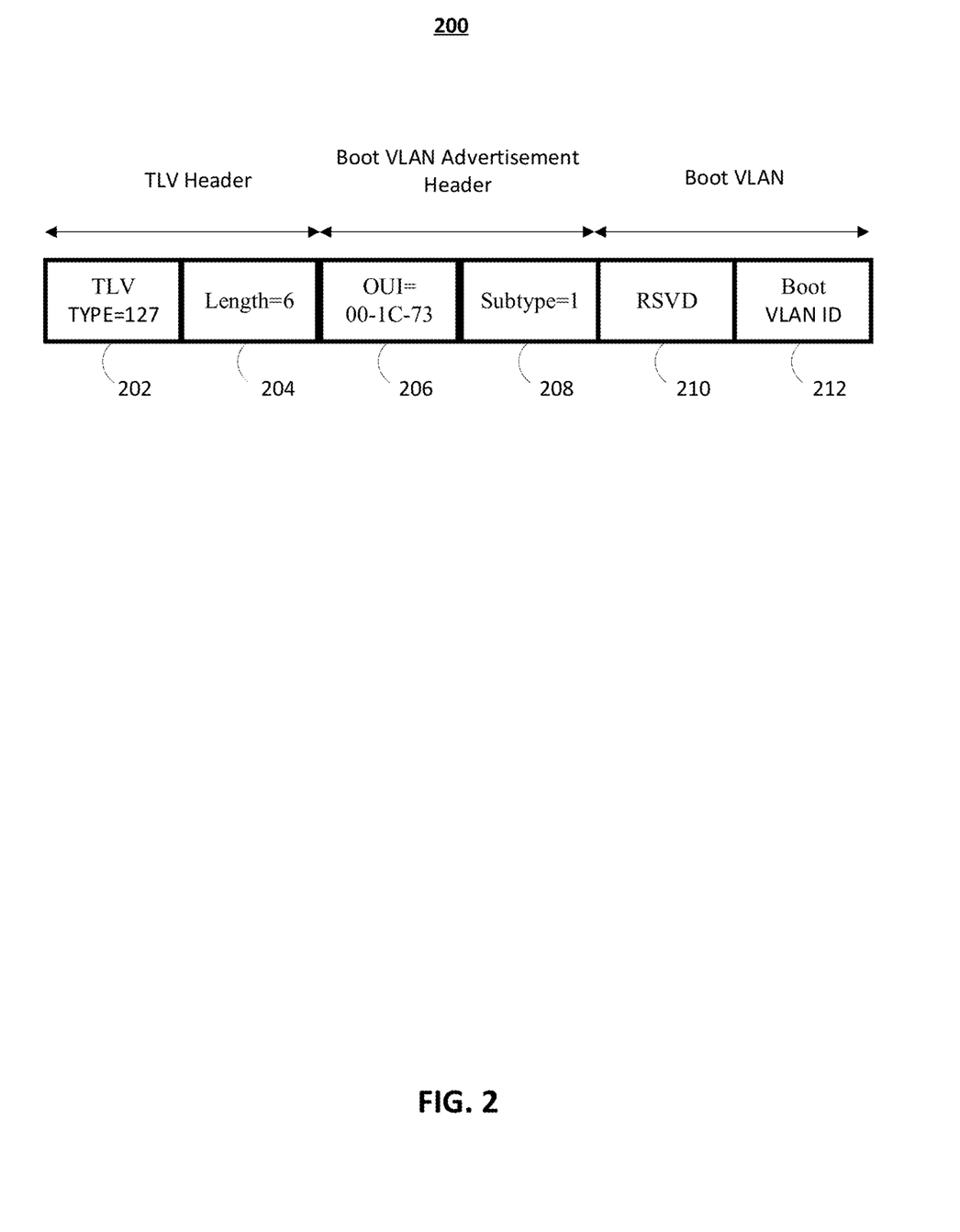
FIG. 2 shows an example of an ethernet frame comprising a virtual local area network (VLAN) identifier, in accordance with some embodiments of the disclosure.

FIG. 2 shows an example of an ethernet frame comprising a VLAN ID, in accordance with some embodiments of the disclosure. The ethernet frame 200 may be an entire ethernet frame or only a part of a larger ethernet frame. The ethernet frame 200 may be any ethernet frame capable of giving devices a means of announcing basic information to other devices on a LAN with one example being an LLDP message. The ethernet frame 200 comprises a type-length-value (TLV) header that includes a type field 202 and a length field 204. As shown, the type field 202 has a value of 127, but any similar such value may be used. In some embodiments, the type value may be a reserved LLDP TLV value (e.g., values 9 through 126 inclusive).

The ethernet frame 200 also comprises a Boot VLAN advertisement header that includes an organizationally unique identifier (OUI) field 206 and a subtype field 208. Subtype field 208 is shown as being defined by subtype 1, but further subtypes can be defined for other purposes such as authentication. For example, a subtype may be defined to send a root of trust. In some embodiments, an aggregate switch (e.g., switch 104) may send a root of trust for an instance of a workload orchestration software (e.g., CVP) using subtype field 208 to a newly connected switch (e.g., switch 102). In another example, a subtype may be defined to include information to uniquely identify a new device to the network (e.g., organization identification (ORG-ID) tokens). In some embodiments, a subtype may be defined to include both the information to uniquely identify a new device and a root of trust.

The ethernet frame 200 also comprises a Boot VLAN that includes a Reserved (RSVD) field 210 and a Boot VLAN ID field 212. In some embodiments, the Boot VLAN ID field includes a VLAN identifier, where the VLAN identifier identifies the VLAN that a switch can use to reach a DHCP server. In some embodiments, the VLAN identifier may be unique to a switch that requested the VLAN ID. In some embodiments, information to uniquely identify a new device and a root of trust may be included as optional parameters after the Boot VLAN ID field 212. For example, the subtype field 208 may have a value of 1, but an extension field may be added after the Boot VLAN ID field 212. In some embodiments, when the extension field is set to a value of 1, a root of trust may be included within the ethernet frame 200. In other embodiments, when the extension field is set to a value of 2, a root of trust and an ORG-ID token may be included within the ethernet frame 200. In another embodiment, when the extension field is set to a value of 0, this may indicate that neither a root of trust nor an ORG-ID token is included within the ethernet frame 200.

Figure 3:
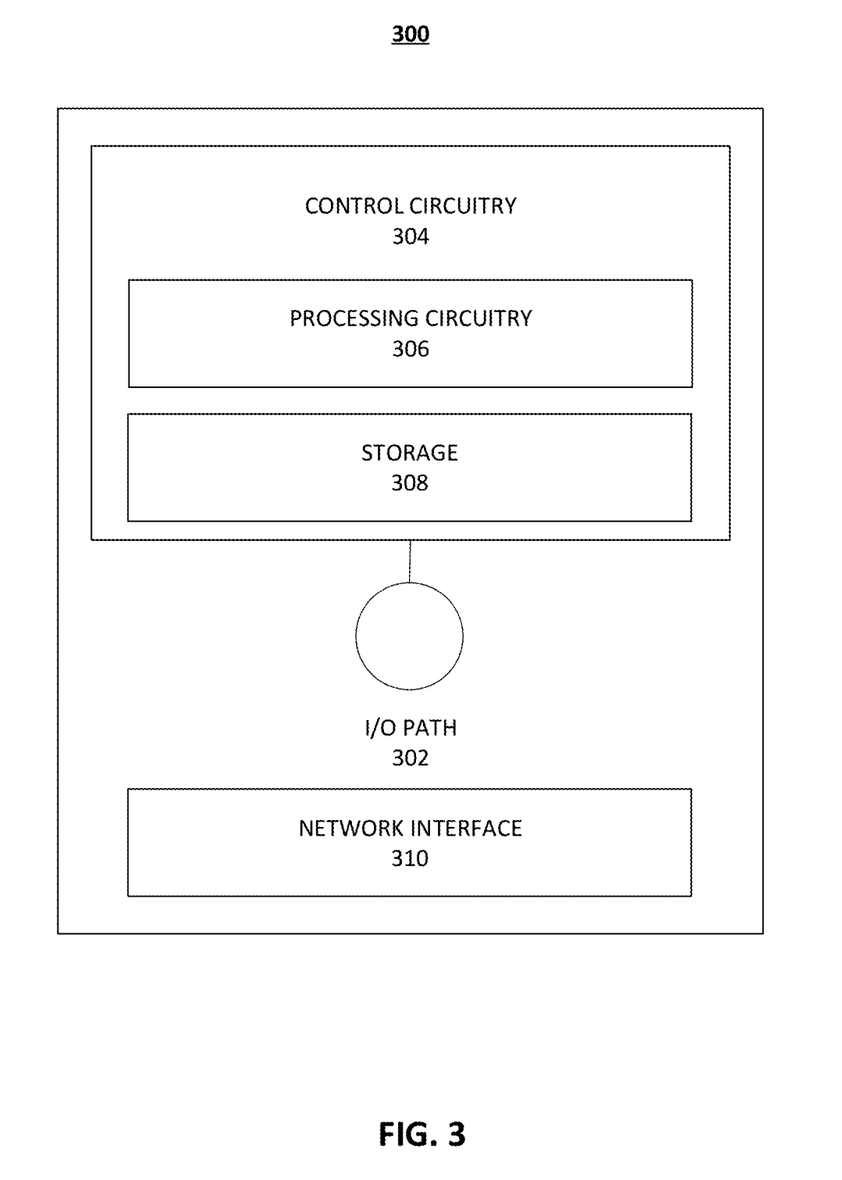
FIG. 3 shows a diagram of an illustrative switch implemented in the improved ZTP process, in accordance with some embodiments of the disclosure.

FIG. 3 shows a diagram of an illustrative switch implemented in the improved ZTP process, in accordance with some embodiments of the disclosure. In particular, device 300 of FIG. 3 may be any of the devices depicted in FIGS. 1A and 1B (e.g., devices 102, 104, 106, 108, 110, and 112) or may be a physical or virtual device hosting any of physical devices, virtual devices, or servers 102, 104, 106, 108, 110, and 112. Device 300 may be a router, a switch, or a host, and/or any other computing device that may be configured to participate in switching or routing. Although the systems and methods described herein are often in terms of switches, the described systems and methods can also be used in the context of routers. For example, a first router may be provisioned where the first router receives a VLAN identifier (VLAN ID) from a second router, allowing the first router to reach the DHCP server.

Device 300 may receive data via data network interface 310 and provide the received data to control circuitry 304 via an input/output (I/O) path 302. Control circuitry 304 includes processing circuitry 306 and storage 308. Storage 308 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connects device 300 to one or more other devices. For example, I/O path 302 may provide route packets to next hops listed in a forwarding table.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include a MAC table. Multiple circuits may be provided to handle simultaneous processing functions. In some embodiments, device 300 may be a virtual device, wherein components 304, 306, 308, 302 and 310 are virialized on top of another physical device.

Figure 4:
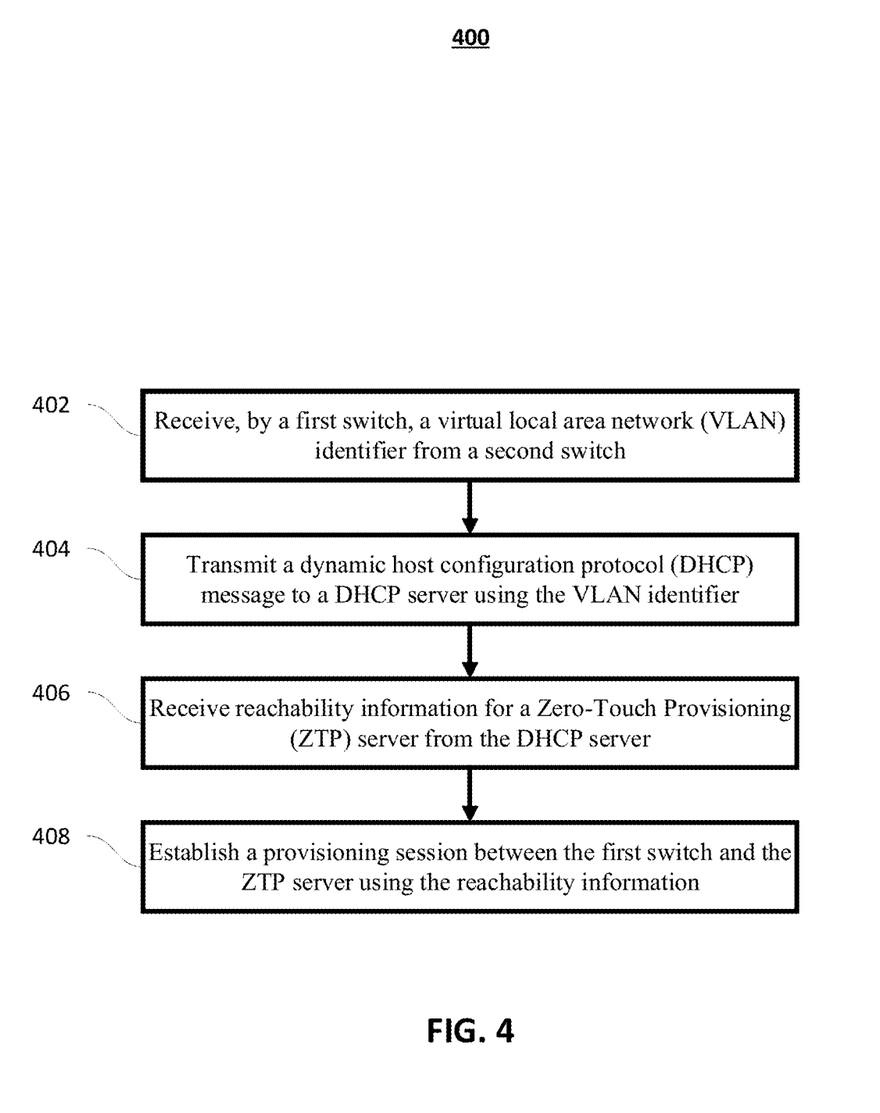
FIG. 4 is a flowchart of an illustrative process for the improved ZTP process, in accordance with some embodiments of the present disclosure.

FIG. 4 is a flowchart of an illustrative process for the improved ZTP process, in accordance with some embodiments of the present disclosure. Process 400 may be performed by physical or virtual control circuitry, such as control circuitry 304 of device 300 (FIG. 3). For example, process 400 may be performed by control circuitries of devices 102, 104, 106, 108, 110, and 112. In some embodiments, some steps of process 400 may be performed by one of several devices.

At step 402, control circuitry receives a VLAN identifier from a switch. The VLAN identifier may be included in a first message received from the switch. In some embodiments, the switch is configured to advertise unsolicited messages to the network at regular time intervals and the first message is one of these messages. In some embodiments, the switch may be responding to a request for bootup information received from the control circuitry. The first message may be any message type that is encapsulated in ethernet frames for the purpose of giving devices a means of announcing information to other devices on a LAN, with one example being an LLDP message (e.g., the ethernet frame of FIG. 2). The VLAN identifier, included in the message, identifies the VLAN that the control circuitry can use to reach a DHCP server. In some embodiments, the message that includes the VLAN identifier also includes additional ZTP-related information. For example, the message may contain multiple VLAN identifiers (where multiple VLAN headers are required), authentication information, and similar such ZTP-related information.

At step 404, control circuitry transmits a DHCP message to a DHCP server using the VLAN identifier. The DHCP message may be a DHCP discover message that is tagged with the VLAN identifier. The discover message is able to reach the DHCP server because the discover message is tagged with the VLAN ID. The VLAN ID tag ensures that the discover message is routed onto a VLAN corresponding to the VLAN ID. For example, a network device that receives the discover message that comprises the VLAN identifier tag will forward the discover message according to the VLAN identifier tag. In some embodiments, a network device that receives the discover message will transmit the discover message to all ports on the network device associated with the VLAN identifier. In some embodiments, the DHCP server is reachable through the VLAN that is associated with the VLAN identifier received from the switch at step 402.

At step 406, control circuitry receives reachability information for a ZTP server from the DHCP server. In some embodiments, the DHCP server receives the discover message from the control circuitry and assigns the control circuitry an IP address. The DHCP server may also send reachability information (e.g., IP address and/or the URL) corresponding to a ZTP server to the control circuitry.

At step 408, control circuitry establishes a provisioning session between the control circuitry and the ZTP server using the reachability information provided by the DHCP server. The control circuitry is configured to use the reachability information to connect to the ZTP server. After the control circuitry connects to the ZTP server, the ZTP server provisions the control circuitry. In some embodiments, the ZTP server is managed by workload orchestration software (e.g., CVP).

Figure 5:
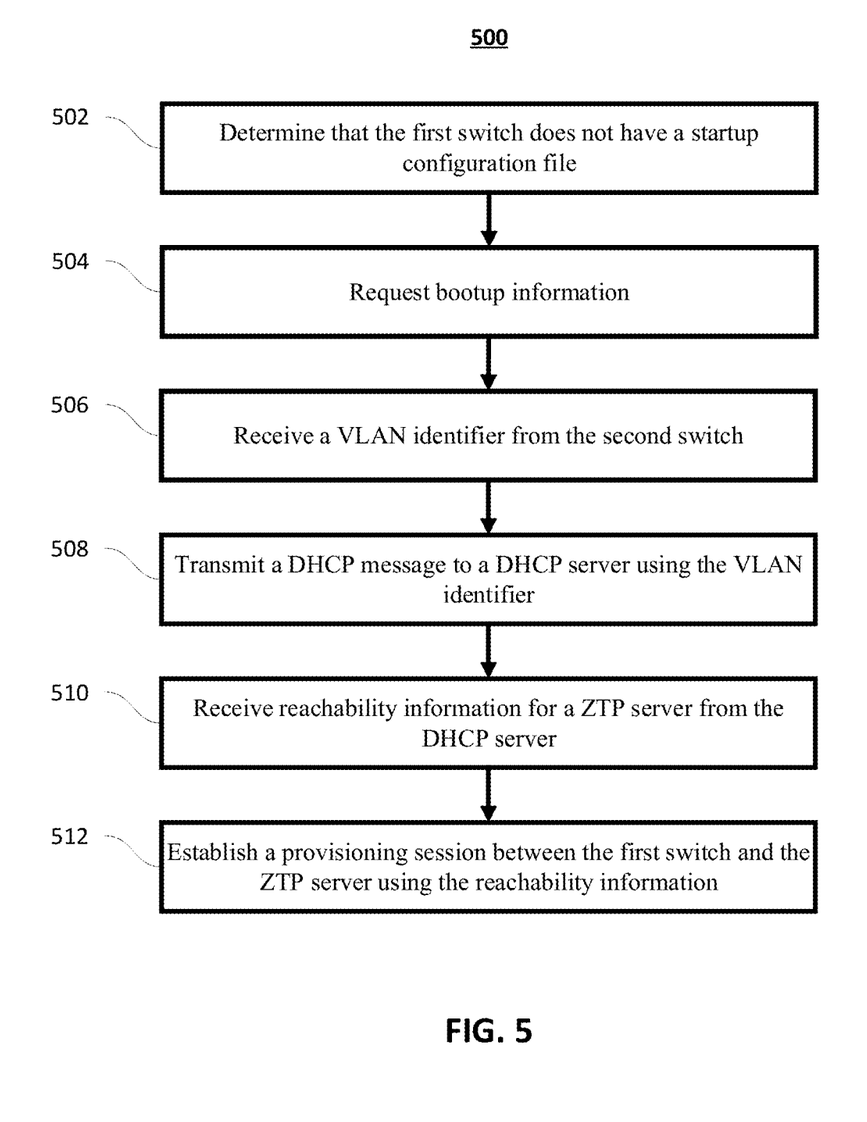
FIG. 5 is another flowchart of an illustrative process for the improved ZTP process, in accordance with some embodiments of the present disclosure.

FIG. 5 is a flowchart of an illustrative process for the improved ZTP process, in accordance with some embodiments of the present disclosure. At step 502, control circuitry, determines that the control circuitry does not have a startup configuration file. In some embodiments, the control circuitry is new to the network and has not yet been configured. In other embodiments, control circuitry may be a part of the network, but the control circuitry requires updated configuration files.

At step 504, control circuitry requests bootup information. In some embodiments, control circuitry transmits a bootup request to the network. The bootup request may be a message or a part of any message type that is encapsulated in ethernet frames for the purpose of giving devices a means of announcing information to other devices on a LAN, with one example being an LLDP message. The control circuitry may transmit the bootup request using one or more data plane ports. In some embodiments, the control circuitry advertises the bootup request using all ports available to the control circuitry. In some embodiments, the control circuitry transmits the bootup request using a port with a link that indicates connectivity to the LAN.

At step 506, control circuitry receives a VLAN identifier from a switch. The VLAN identifier may be included in a message received from the switch. The switch may be responding to the bootup request transmitted by the control circuitry in step 504. The message may be any message type that is encapsulated in ethernet frames for the purpose of giving devices a means of announcing information to other devices on a LAN, with one example being an LLDP message (e.g., the ethernet frame of FIG. 2). The VLAN identifier, included in the message, identifies the VLAN that the control circuitry can use to reach a DHCP server.

At step 508, control circuitry transmits a DHCP message to a DHCP server using the VLAN identifier. The DHCP message may be a DHCP discover message that is tagged with the VLAN identifier. In some embodiments, the DHCP server is reachable through the VLAN that is associated with the VLAN identifier received from the switch at step 506.

At step 510, control circuitry receives reachability information for a ZTP server from the DHCP server. In some embodiments, the DHCP server receives the discover message from the control circuitry and assigns the control circuitry an IP address. The DHCP server may also send reachability information (e.g., IP address and/or the URL) corresponding to a ZTP server to the control circuitry.

At step 512, control circuitry establishes a provisioning session between the control circuitry and the ZTP server using the reachability information. The control circuitry is configured to use the reachability information to connect to the ZTP server. After the control circuitry connects to the ZTP server, the ZTP server provisions the control circuitry. In some embodiments, the ZTP server is managed by workload orchestration software (e.g., CVP).

Figure 6:
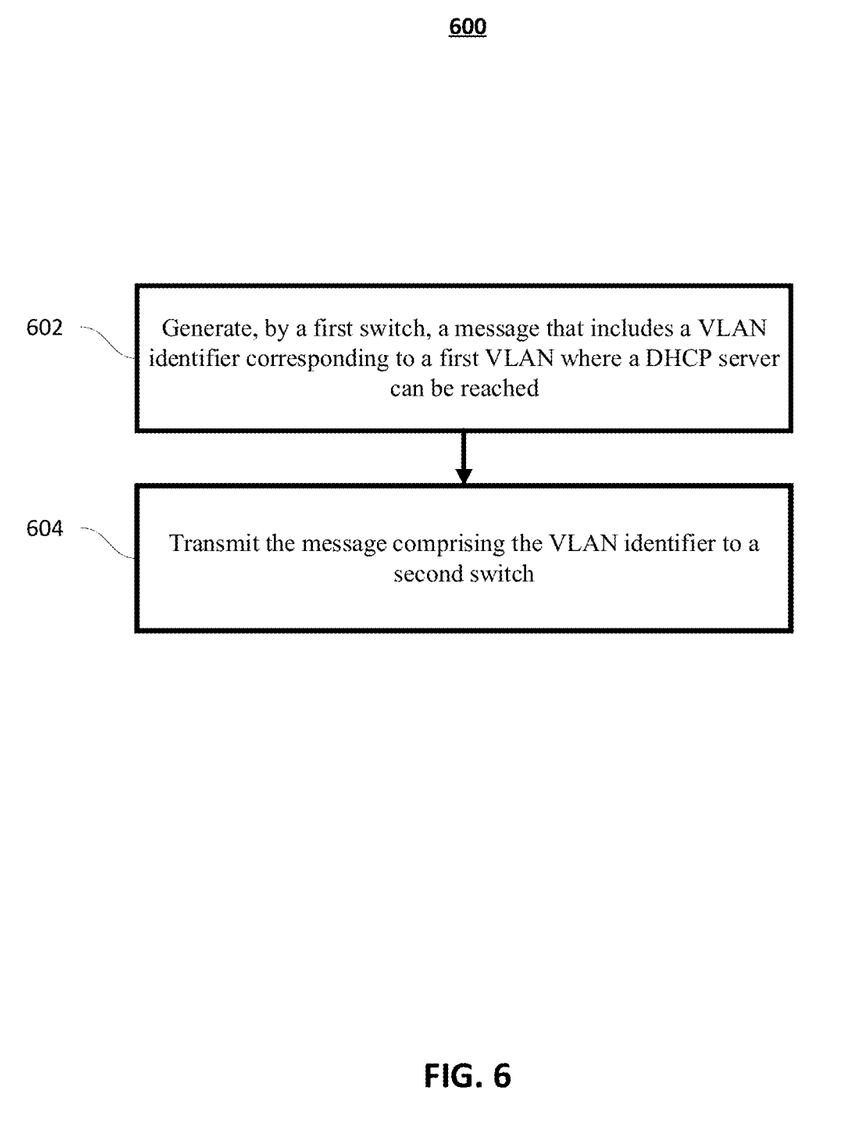
FIG. 6 is another flowchart of an illustrative process for the improved ZTP process, in accordance with some embodiments of the present disclosure.

FIG. 6 is a flowchart of an illustrative process for the improved ZTP process, in accordance with some embodiments of the present disclosure.

At step 602, control circuitry generates a message that includes a VLAN identifier corresponding to a VLAN where a DHCP server can be reached. In some embodiments, the control circuitry is configured to advertise unsolicited messages to the network at regular time intervals and the message is one of these messages. In some embodiments, the switch may be responding to a request for bootup information received from a switch. The generated message may be any message type that is encapsulated in ethernet frames for the purpose of giving devices a means of announcing information to other devices on a LAN, with one example being an LLDP message (e.g., the LLDP message of FIG. 2). The control circuitry will include a VLAN identifier in the message, where the VLAN identifier identifies a VLAN that a switch can use to reach a DHCP server. In some embodiments, the VLAN identifier may be unique to a switch that requested bootup information from the control circuitry. In some embodiments, the generated message also includes additional ZTP-related information. For example, certain network topologies may require a switch to include multiple VLAN headers in a DHCP discover message to ensure the discover message is correctly forwarded to the DHCP server. In such a network, the control circuitry may include multiple VLAN identifiers in the generated message. Additional ZTP-related information may also include authentication information (e.g., a root of trust) and/or information to uniquely identify a new device (e.g., ORG-ID tokens).

At step 604, control circuitry transmits the message comprising the VLAN identifier to a switch. In some embodiments, the control circuitry is configured to advertise unsolicited messages to the network at regular time intervals and the message arrives at one or more switches unsolicited. In some embodiments, the control circuitry may transmit the message to one or more switches in response to the one or more switches requesting bootup information.

Figure 7:
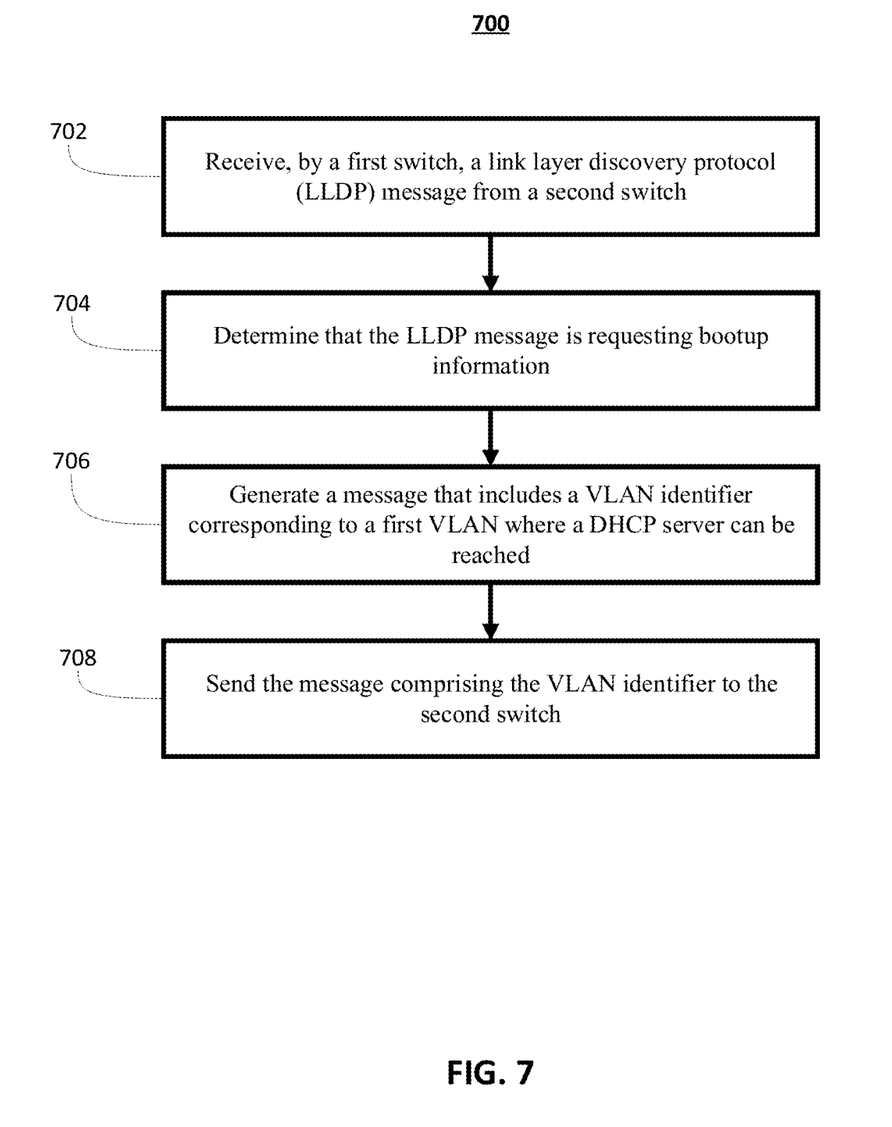
FIG. 7 is another flowchart of an illustrative process for the improved ZTP process, in accordance with some embodiments of the present disclosure.

FIG. 7 is a flowchart of an illustrative process for the improved ZTP process, in accordance with some embodiments of the present disclosure. At step 702, control circuitry receives a message requesting bootup information from a switch. The message requesting bootup information may be a message type or a part of any message type that is encapsulated in ethernet frames for the purpose of giving devices a means of announcing information to other devices on a LAN, with one example being an LLDP message.

At step 704, control circuitry determines that the received message is requesting bootup information for the switch that sent the message. In some embodiments, the control circuitry can authenticate the switch that sent the message before proceeding to step 706. For example, the control circuitry may perform a MAC-based authentication (MBA). In some embodiments, prior to performing an MBA, the control circuitry may be configured for an LLDP bypass, allowing an operating system on the switch to review the received message. The switch can use the source MAC-address of the received message to perform an MBA.

At step 706, control circuitry generates a message that includes a VLAN identifier corresponding to a VLAN where a DHCP server can be reached. The generated message may be any message type that is encapsulated in ethernet frames for the purpose of giving devices a means of announcing information to other devices on a LAN, with one example being an LLDP message (e.g., the LLDP message of FIG. 2). The control circuitry will include a VLAN identifier in the generated message, where the VLAN identifier identifies a VLAN that the switch can use to reach a DHCP server. In some embodiments, the generated message also includes additional ZTP-related information. For example, certain network topologies may require the switch to include multiple VLAN headers in a DHCP discover message to ensure the discover message sent by the switch is correctly forwarded to the DHCP server. In such a network, the control circuitry may include multiple VLAN identifiers in the generated message.

As discussed above, additional ZTP-related information may also include authentication information.

At step 708, control circuitry transmits the generated message comprising the VLAN identifier to a switch. The control circuitry transmits the message to the switch that sent the LLDP message requesting bootup information.

The processes 400, 500, 600, and 700 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
receiving, by a first switch, a virtual local area network (VLAN) identifier from a second switch, the VLAN identifier identifying a VLAN to which a dynamic host configuration protocol (DHCP) server is connected;
transmitting, by the first switch, a DHCP discover message based on the VLAN identifier;
receiving, by the first switch, reachability information for a Zero-Touch Provisioning (ZTP) server from the DHCP server; and
establishing a provisioning session between the first switch and the ZTP server using the reachability information.

2. The method of claim 1, wherein the first switch is an access switch and the second switch is an aggregation switch.

3. The method of claim 1, further comprising:
determining, by the first switch, that the first switch does not have a startup configuration file; and
requesting, by the first switch, bootup information from the second switch.

4. The method of claim 1, further comprising:
advertising, by the second switch, a message that includes the VLAN identifier.

5. The method of claim 4, wherein the advertising, by the second switch, occurs at defined time intervals.

6. The method of claim 1, wherein receiving, by a first switch, a VLAN identifier from a second switch, further comprises:
receiving, by the first switch, additional information related to ZTP from the second switch.

7. The method of claim 6, wherein the additional information includes a second VLAN identifier or authentication information.

8. The method of claim 7, wherein the authentication information includes a root of trust.

9. An apparatus comprising:
control circuitry; and
at least one memory including computer program code for one or more programs, the at least one memory and the computer program code configured to, with the control circuitry, cause the apparatus to perform at least the following:
receive a virtual local area network (VLAN) identifier from a first switch, the VLAN identifier identifying a VLAN to which a dynamic host configuration protocol (DHCP) server is connected;
transmit a DHCP discover message based on the VLAN identifier;
receive reachability information for a Zero-Touch Provisioning (ZTP) server from the DHCP server; and
establish a provisioning session between the apparatus and the ZTP server using the reachability information.

10. The apparatus of claim 9, wherein the apparatus is an access switch and the first switch is an aggregation switch.

11. The apparatus of claim 9, wherein the apparatus is further caused to:
determine that the apparatus does not have a startup configuration file; and
request bootup information from the first switch.

12. The apparatus of claim 9, wherein the apparatus is further caused, when receiving a VLAN identifier from the first switch, to receive additional information related to ZTP from the first switch.

13. The apparatus of claim 12, wherein the additional information includes a second VLAN identifier or authentication information.

14. The apparatus of claim 13, wherein the authentication information includes a root of trust.

15. A non-transitory computer-readable medium having instructions encoded thereon that, when executed by control circuitry cause the control circuitry to:
receive a virtual local area network (VLAN) identifier from a first switch, the VLAN identifier identifying a VLAN to which a dynamic host configuration protocol (DHCP) server is connected;
transmit a DHCP discover message using the VLAN identifier;
receive reachability information for a Zero-Touch Provisioning (ZTP) server from the DHCP server; and
establish a provisioning session between the control circuitry and the ZTP server using the reachability information.

16. The non-transitory computer-readable medium of claim 15, wherein the control circuitry is part of an access switch and the first switch is an aggregation switch.

17. The non-transitory computer-readable medium of claim 15, wherein the control circuitry is further caused to:
determine that the control circuitry does not have a startup configuration file; and
request bootup information from the first switch.

18. The non-transitory computer-readable medium of claim 15, wherein the control circuitry is further caused, when receiving a VLAN identifier from the first switch, to receive additional information related to ZTP from the first switch.

19. The non-transitory computer-readable medium of claim 18, wherein the additional information includes a second VLAN identifier or authentication information.

20. The non-transitory computer-readable medium of claim 19, wherein the authentication information includes a root of trust.

* * * * *